United States Patent [19]
Robinson

[11] Patent Number: 5,320,253
[45] Date of Patent: Jun. 14, 1994

[54] APPARATUS FOR DISPENSING AGRICULTURAL LIQUID CHEMICALS

[75] Inventor: Rodrick C. Robinson, Leavening, Great Britain

[73] Assignee: Horstine Farmery Limited, York, United Kingdom

[21] Appl. No.: 742,882

[22] Filed: Aug. 9, 1991

[30] Foreign Application Priority Data

Aug. 15, 1990 [GB] United Kingdom ............... 9017864
Mar. 13, 1991 [GB] United Kingdom ............... 9105321

[51] Int. Cl.$^5$ ............................................. F16K 15/14
[52] U.S. Cl. ............................... 222/175; 222/481; 222/481.5; 222/189; 137/854
[58] Field of Search ............... 222/189, 185, 181, 175, 222/212, 213, 478, 481, 400.5, 481.5, 482, 494; 137/587, 588, 854

[56] References Cited

U.S. PATENT DOCUMENTS

| | | | |
|---|---|---|---|
| 2,859,771 | 11/1958 | Blagg | 137/854 X |
| 3,160,329 | 12/1964 | Radic et al. | 222/494 X |
| 3,176,883 | 4/1965 | Davis, Jr. | 222/482 X |
| 3,228,418 | 1/1966 | Rosback et al. | 137/854 X |
| 3,250,219 | 5/1966 | McCarty et al. | 137/854 X |
| 3,403,696 | 10/1968 | Pynchon | 137/854 X |
| 3,941,149 | 3/1976 | Mittleman | 137/854 X |
| 4,506,809 | 3/1985 | Corsette | 222/494 X |
| 4,513,891 | 4/1985 | Hain et al. | 222/494 X |
| 4,610,275 | 9/1986 | Beecher | 137/854 |
| 4,646,945 | 3/1987 | Steiner et al. | 222/481 X |
| 5,033,647 | 7/1991 | Smith et al. | 222/494 X |
| 5,067,449 | 11/1991 | Bonde | 137/854 X |
| 5,165,578 | 11/1992 | Laible | 222/481 X |

FOREIGN PATENT DOCUMENTS

2237975 3/1973 Fed. Rep. of Germany .
1163107 4/1978 Fed. Rep. of Germany .
1577522 8/1969 France .
2399788 3/1979 France .
1507151 4/1978 United Kingdom .

*Primary Examiner*—Kevin P. Shaver
*Attorney, Agent, or Firm*—Scully, Scott, Murphy & Presser

[57] ABSTRACT

A manual applicator, for dispensing liquid agricultural chemicals, comprises a reservoir for the liquid chemical and hand-held dispensing apparatus. The reservoir is provided with a non-return valve adapted to allow ar to flow into the reservoir only when the pressure in the head space in the reservoir falls below a predetermined pressure below atmosphere.

18 Claims, 2 Drawing Sheets

APPARATUS FOR DISPENSING AGRICULTURAL LIQUID CHEMICALS

This invention relates to apparatus for dispensing agricultural liquid chemicals and, more particularly, to apparatus for manually dispensing such chemicals.

Manual applicators for dispensing agricultural liquid chemicals are well known in the art and are available in many forms but, essentially, all such applicators comprise a reservoir for containing the agricultural liquid chemical to be dispensed and a hand-held dispensing apparatus, generally of tube-like form, with means for controlling the flow of liquid through the dispensing apparatus.

The reservoir for the liquid chemical is generally made from a metal or plastics material, inert with respect to the chemicals to be dispensed, and may comprise;

(1) a so-called "back-pack" or "knapsack" reservoir, wherein the reservoir is fitted with shoulder straps, or is supported by a frame including shoulder straps, by which the reservoir is carried on the back of the wearer, with a duct connecting the reservoir to the hand-held dispensing apparatus, or (2) a container-type reservoir, frequently in the form of a plastic bottle, presenting a mouth-like opening which is connectable directly to the hand-held dispensing apparatus.

The knapsack type reservoir may include a hand-operated pump, for pumping liquid chemical from the reservoir, whilst the back-pack dispensing apparatus is generally a gravity feed arrangement. However, in both such embodiments the level of the liquid in the reservoir is higher than the point of outlet from the apparatus when the apparatus is in its position of use.

As the liquid chemical flows through the said means for controlling the flow of liquid through the apparatus only when the flow passage through said means is open, the liquid flowing through the said means forms a seal preventing the flow of air from the liquid outlet upstream to the reservoir. Thus, in practise, as the level of liquid in the reservoir falls the pressure in the head space above the liquid chemical in the reservoir falls and the rate of discharge through the dispensing arrangement can be adversely affected.

The prior art method for overcoming this problem is to provide an aperture in the top wall of the back-pack or knapsack reservoir, or in a filler cap closing a filling aperture in said top wall, so that the head space in the reservoir is always in open communication with the surrounding atmosphere. This often leads to spillage of expensive, and sometimes dangerous, chemical if the back-pack is taken off and placed where the level of liquid in the reservoir is above the venting aperture and, more seriously, should the user bend or accidentally fall forwardly, chemical can spill through the venting aperture onto the clothing and/or the upper body of the user and cause serious damage and injury thereto.

The container-type applicator is also a gravity feed apparatus and the reservoir may conveniently present a screw-threaded mouth arranged to be threadedly engaged directly with the hand-held dispensing apparatus. In use, the container is inverted so that the threaded mouth of the container defines the lowermost part of the reservoir and liquid chemical can flow under gravity to the dispensing apparatus.

The use of such a reservoir container, and its disposition in use, can lead to the creation of a low pressure in the head space above the liquid in the reservoir, which can adversely affect the controlled dispensing of the chemical.

To overcome this problem prior art container-type arrangements are often fitted with a duct which extends into the reservoir, through the mouth closure and into the upper regions of the container, whilst externally the duct is attached to the outside of the container and is open to atmosphere at a point above the liquid level in the container whilst the apparatus is in its position for dispensing. Thus, the head space above the liquid in the container is continuously vented to atmosphere.

With such an arrangement, chemical can spill from the container if the device is rested in such a position that the reservoir end of the duct is below the level of liquid in the reservoir and the outer end of the duct is also lower than the liquid level, whereupon liquid chemical can flow, under gravity from the reservoir through the duct to the external end thereof.

The present invention seeks to provide a manual dispensing apparatus for dispensing liquid chemicals and which allows the reservoir to be vented without the danger of spillage of the liquid chemical through the venting means.

According to the present invention there is provided a manual applicator, for dispensing liquid agricultural chemicals, comprising a reservoir for liquid chemical to be dispensed, an outlet duct from said reservoir and a hand-held dispensing apparatus connected to said outlet duct, characterised by a non-return valve arrangement adapted to prevent the leakage of liquid chemical therethrough whilst allowing air to flow into the reservoir only whilst the pressure in the head space above the liquid chemical in the reservoir is at, or less than, a predetermined pressure below atmosphere.

Preferably the said non-return valve comprises a diaphragm valve, including a diaphragm.

In a preferred embodiment the said diaphragm is of annular form and defines a central region, with a central bore therethrough, and a surrounding region surrounding said central region, said surrounding region terminating at a peripheral edge region concentric with the axis of said central bore.

In another preferred embodiment the said diaphragm is of annular form and defines a central region, with a central bore therethrough, and a surrounding region surrounding said central region and terminating at a peripheral edge region concentric with the axis of said central bore and wherein, in an un-stressed condition for the diaphragm, the peripheral edge region of said diaphragm lies in a plane parallel to, but spaced from, the plane of the central region of said diaphragm.

Preferably the said diaphragm is of annular form and defines a central region, with a central bore therethrough, and a peripheral edge region spaced from said central region, and wherein the thickness of the said diaphragm reduces from said central region towards said peripheral edge region.

In a preferred embodiment the central bore through the diaphragm comprises a tapered bore, the smaller diameter end of which is at that end of said bore most remote from the plane of the peripheral edge region of the diaphragm.

In another form the invention resides in a manual applicator, for dispensing liquid agricultural chemicals, comprising a reservoir for liquid chemical to be dispensed, an outlet duct from said reservoir and a hand-held dispensing apparatus connected to said outlet duct, characterised by a non-return valve arrangement connected to said reservoir, said non-return valve arrangement comprising a valve body and a diaphragm mounted on said valve body, said valve body being of generally cylindrical form and defining a blind bore, entered axially into one end thereof, and a radial bore or bores in open communication with said axial bore and which open to a cylindrical surface of the valve body, and wherein said diaphragm defines a central region and a peripheral edge region, said peripheral edge region of said diaphragm lies in a plane parallel to, but spaced from, the plane of the said central region of said diaphragm and said central region defines a central bore therethrough, and wherein said valve body enters into the said central bore of the said diaphragm.

Preferably the said central bore through the central part of the diaphragm comprises a tapered bore and the said valve body defines a tapered seat for the said tapered bore of said diaphragm.

In a preferred embodiment the diaphragm is mounted on a valve body in such manner that the plane of the said peripheral edge region of said diaphragm is at right angles to the axis of said valve body.

In one embodiment the said valve body supports a single diaphragm and, when the diaphragm is mounted on the valve body, the plane of the axis of said radial bore or bores defined by said valve body lies between the central region of the diaphragm and the said plane of the peripheral edge region thereof.

Preferably the said peripheral edge region of the diaphragm directly contacts an internal surface of the reservoir when said diaphragm is in a closure condition.

In another embodiment the valve body includes a flange, defining a surface engageable by the said peripheral edge regions of the diaphragm to define a closure condition for the valve arrangement.

According to a further embodiment of the invention there is provided a manual applicator, for dispensing liquid agricultural chemicals, comprising a reservoir for liquid chemical to be dispensed, an outlet duct from said reservoir and a hand-held dispensing apparatus connected to said outlet duct, characterised by a non-return valve arrangement connected to said reservoir, said non-return valve arrangement comprising a valve body and two diaphragm mounted on said valve body, said valve body being of generally cylindrical form and defining a blind bore, entered axially into one end thereof, and a radial bore or bores in open communication with said axial bore and which open to a cylindrical surface of the valve body, and wherein each said diaphragm defines a central region and a peripheral edge region, the peripheral edge region of each said diaphragm lies in a plane parallel to, but spaced from, the plane of the said central region of that diaphragm, and said central region of each diaphragm defines a central bore therethrough, and wherein said valve body enters into the said central bores of both the said diaphragms when the diaphragms are oppositely facing and said valve body spaces the central regions apart such that the peripheral edge regions of the two diaphragms are in contacting relationship.

In a preferred embodiment the said central bore through the central part of each said diaphragm comprises a tapered bore, the smallest diameter of said tapered bore is at that part of the central region most remote from the peripheral edge region thereof, and the said valve body defines two oppositely tapering seats for the said tapered bores of the two said diaphragms.

Preferably the plane of the axis of the said radial bore or bores lies in the plane of contact for the peripheral edge regions of the two diaphragms.

In one embodiment the valve body is directly connected to a wall defining the reservoir.

In another embodiment the valve body is directly connected to a closure member for the reservoir.

In a further embodiment the said non-return valve is mounted on one end of a dip-tube within the reservoir and the said dip-tube is open to atmosphere through a wall region of the reservoir.

In a further embodiment in accordance with the invention there is provided a manual applicator, for dispensing liquid agricultural chemicals, comprising a reservoir for liquid chemical to be dispensed, an outlet duct from said reservoir and a hand-held dispensing apparatus connected to said outlet duct, characterised by a non-return valve arrangement connected to said reservoir, said non-return valve arrangement comprising a tubular body, the bore of which defines the liquid chemical outlet from the reservoir, and a diaphragm mounted on said tubular body, and wherein said diaphragm defines a central region and a peripheral edge region, said peripheral edge region of said diaphragm lies in a plane parallel to, but spaced from, the plane of the said central region of said diaphragm and said central region defines a central bore therethrough for receiving the tubular body therethrough.

Preferably the said diaphragm is so supported by said tubular body that the said peripheral edge region of the diaphragm is in pressure contact with the wall of the reservoir surrounding the said tubular body.

In a preferred embodiment one or a plurality of ducts pass through the reservoir wall surrounding the tubular body and open to the internal surface of said reservoir wall within the peripheral edge region of the diaphragm, whereby that surface of the diaphragm facing the reservoir wall is continuously open to atmosphere.

Preferably the said tubular body has one end open to the interior of the reservoir and its other end projecting from the reservoir to permit the said outlet duct extending to the said hand-held dispensing apparatus be attached thereto.

In a preferred embodiment the said reservoir includes an opening into the lower regions of said reservoir when the reservoir is in its normal position for dispensing liquid chemical, said opening is closed by a closure member whereupon a surface of said closure member constitutes a part of the reservoir wall, and wherein the said tubular body is passes through said closure member and is supported thereby.

The invention will now be described further by way of example with reference to the accompanying drawings in which, FIG. 1 shows, in diagrammatic side view, a backpack type manual applicator.

Figure 1:
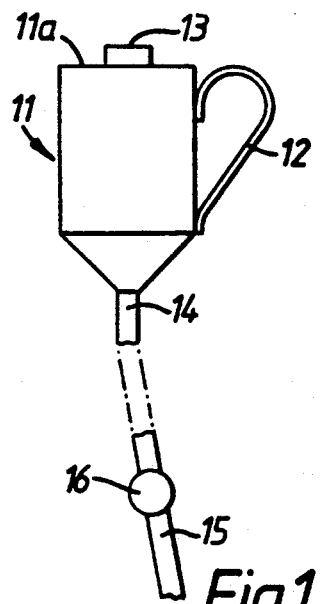

The embodiment illustrated in FIG. 1 is a conventional "back-pack" applicator and comprises a reservoir 11, for a liquid agricultural chemical to be dispensed, provided with shoulder straps 12 by which the reservoir 11 can be supported on the back of the user. The reservoir 11 has an opening in its top wall 11a, surrounded by a threaded boss (not shown), and a threaded closure cap 13 is screwed onto the threaded boss. Thus, the reservoir 11 can be charged with liquid chemical to be dispensed by removing the cap 13, charging the reservoir 11 through the opening in the threaded boss and then re-fitting the closure cap 13.

A flexible duct 14, from the lower regions of the reservoir 11, connects the reservoir 11 with a hand-held dispensing apparatus, generally indicated by reference 15, which includes a valve 16 for controlling the flow of liquid chemical from the reservoir 11 through the apparatus 15 to an outlet (not shown in the drawings) and which outlet, when the dispensing apparatus is in its position of use, is always lower than the surface of liquid in the reservoir.

As described hereinbefore, as liquid chemical flows from the reservoir 11 to the apparatus 15, the level of the liquid in the reservoir 11 will fall, increasing the head space in the reservoir 11 above the free surface of the liquid in the reservoir 11, and as the liquid level in reservoir 11 falls the pressure in the head space will be continuously reducing until it can reach a point at which the free flow of liquid through the valve 16 is severely impaired, and thereby dosage rates are adversely affected.

Figure 2:
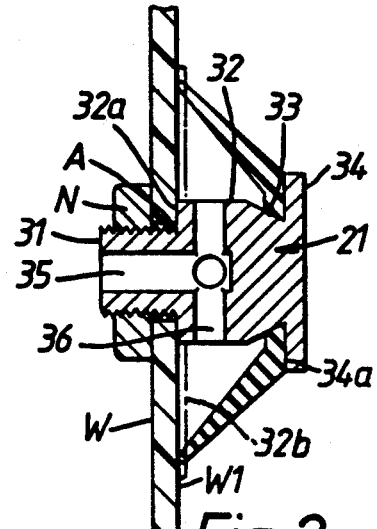
FIG. 2 shows, in axial cross-section, one form of non-return valve in accordance with the invention.

One valve arrangement is for use with the reservoir 11 illustrated in FIG. 1, is illustrated in FIG. 2, and comprises a valve body 21 and a flexible diaphragm 22.

The diaphragm 22 (see FIG. 3) is of substantially truncated conical form and comprises a central region 23 with a tapered bore 24 therethrough. In its unstressed condition the outer wall regions 25 of the diaphragm 22 are inclined to the central axis through the diaphragm 22 such that the peripheral edge 26 of the diaphragm 22 lies in a plane P parallel to, but spaced from, the central region 23 and at right angles to the central axis through the diaphragm 22.

The tapered bore 24 through the diaphragm 22 has its smaller diameter end 24a most remote from the plane P of the peripheral edge 26 of the diaphragm 22.

The diaphragm may be made of any natural or synthetic flexible resilient material that is essentially inert with respect to the chemical to be dispensed.

Figure 3:
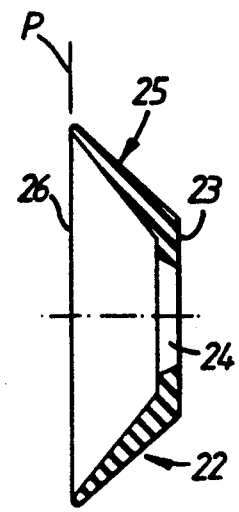
FIG. 3 shows an axial cross-section through a diaphragm for a non-return valve according to the invention.

As will be seen from FIGS. 2 and 3, the outer wall region 25 of the diaphragm 22 reduces in thickness from the central regions 23 to the peripheral edge 26.

The valve body 21 is of general cylindrical configuration and defines a plurality of sections along its axial length.

Thus, the valve body 21 presents a threaded end section 31 which terminates at the radial face 32a of a cylindrical section 32, at the end of cylindrical section 32 most remote from the threaded end section 31 the body 21 presents a tapered seat 33 for the diaphragm 22, the smallest diameter of the tapered seat 33 being most remote from the threaded end section 31, and the tapered seat 33 terminates at the inner radial wall 34a of a flange 34.

The valve body 21 also includes an axial bore 35, open at the radial face of the threaded end section 31, and which axial bore 35 extends into the body 21 to radial bores 36, which open to the cylindrical surface of the cylindrical section 32.

A diaphragm 22 is mounted on the body 21 by flexing the diaphragm 22 so that it can pass over the threaded end 31 and over the cylindrical part 32 to seat on the tapered seat 33 with its central region 23 most remote from the peripheral edge 26 in seating contact with the radial face 34a of the flange 34.

The axial length of the diaphragm 22, when properly located on the valve body 21 and un-stressed, is slightly greater than the axial distance between the radial face 34a of flange 34 and the radial face 32a of the cylindrical part 32. Thus, when the threaded end section 31 of the valve 21, 22 is located in an aperture A in a wall W of a reservoir, and which wall W may comprise the radial face of the filler-cap 13 or the top wall 11a, and secured by a nut N externally of the reservoir engaged on the threaded end section 31, the radial face 32a is in abutting relationship with the inner surface W1 of the wall W and the diaphragm 22 is under a small axially compressive loading, whereupon the peripheral edge 26 is in pressure contact with the inner surface W1 of wall W.

When so located, the radial bores 36 open at the cylindrical part 32 of the body 21 between the central region 23 and the peripheral edge 26 of the diaphragm 22 and whereby the volume defined by the concave face of the diaphragm 22 is continuously open to atmosphere.

With the non-return valve 21-22 so located and secured within the reservoir, with the peripheral edge 26 of the diaphragm 22 in pressure contact with the internal surface W1 of wall W, liquid in the reservoir cannot leak between the peripheral edge 26 of the diaphragm and surface W1 of the wall W of the container, even when the liquid level in the reservoir is above the diaphragm 22.

In the event now that the pressure in the head space falls below a predetermined level, the fall in pressure generates a pressure difference across the diaphragm 22 with the greater pressure acting on the concave face of the diaphragm 22, whereupon the diaphragm 22 deflects, reducing the sealing pressure between the peripheral edge 26 and the surface W1, and air can flow past the peripheral edge 26 of the diaphragm 22 to the head space in the reservoir.

It will now be seen that with the non-return valve 21, 22 liquid within the reservoir cannot escape past the diaphragm 22 whilst air can flow through the non-return valve 21-22 to the head space to prevent said head space from falling to that low pressure at which the flow of liquid from the reservoir is impaired.

In the embodiment illustrated in FIG. 2, the periphery 26 of the diaphragm 22 is illustrated as making direct contact with the inner surface W1 of the wall W. However, when the surface W1 is rough or is otherwise unsuitable for making a seal by direct contact with the diaphragm 22, the valve body 21 may include an annular flange 32b, shown in broken line in FIG. 2, presenting one radial surface engageable by the periphery 26 of the diaphragm 22 and an opposite surface for engagement with the surface W1, conveniently via a resilient sealing member (not shown) between the said flange and the surface W1.

Figure 4:
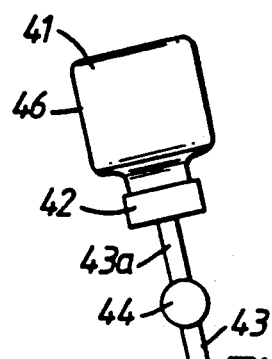
FIG. 4 shows, in diagrammatic side view, a second embodiment for a manual applicator.

In the applicator arrangement shown in FIG. 4 a reservoir 41 comprises a bottle, which may be of glass or a convenient plastics material, with a threaded neck outlet (not shown) and said threaded neck is attached to a cap element 42, internally threaded to receive the threaded neck of the reservoir 41, of a dispensing apparatus 43 and which applicator 43 includes a valve 44 for controlling the flow of liquid through the dispensing apparatus 43.

Figure 5:
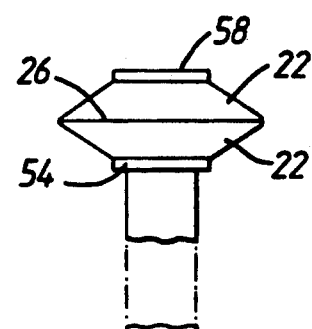
FIG. 5 shows, in axial cross- section, a second embodiment non-return valve in accordance with the invention.
Figure 5:
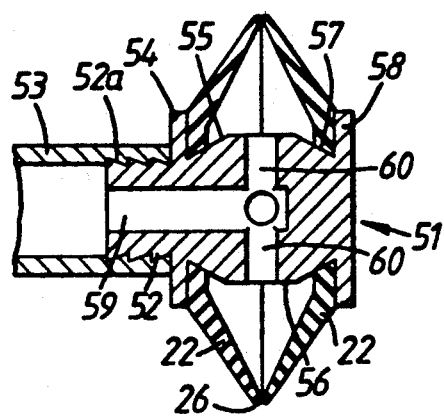

FIG. 5 shows a second non-return valve arrangement and which is particularly suited to the type of applicator illustrated in FIG. 4.

In the FIG. 5 embodiment a valve body 51 comprises a generally cylindrical body defining, from one radial end, a connecting section 52 having a serrated cylindrical periphery 52a, intended to be inserted into and retained by the bore of a dip-tube 53. The connection section 52 terminates at a radial flange 54 and, at that side of the flange 54 remote from the connecting section 52, the body 51 defines a first conical valve seat 55 for a first diaphragm 22. Adjacent the large end of the conical valve seat 55 the body defines a cylindrical section 56, which terminates in the large diameter end of a second conical valve seat 57 for a second diaphragm 22. The smaller diameter end of the conical seat 57 terminates at an annular flange 58.

The body further includes a blind bore 59, extending axially from the radial face of the connecting section 52, in open communication with radial bores 60, which open in the cylindrical surface of cylindrical section 56. The plane of the axes of the radial axial bores 60 lies midway between the flanges 54 and 58.

Two diaphragms 22, which may be identical to the diaphragm 22 illustrated in FIG. 3, are mounted on the valve body, each diaphragm being supported on a conical seat 55 or 57 individual thereto. The axial length between the diaphragm-engaging surfaces of the flanges 54 and 58 is slightly less than the axial length of the two diaphragms 22 in an un-stressed condition so that, when assembled on the valve body 51, the two diaphragms 22 are in pressure contact at their peripheral edges 26.

Figure 6:
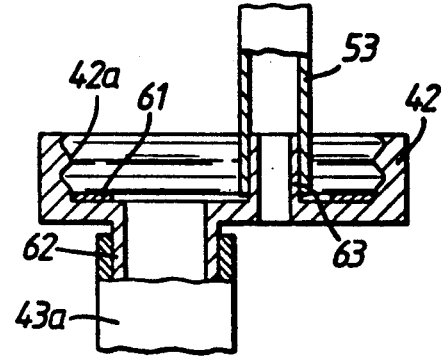
FIG. 6 shows, partially in cross-section, an attachment for the reservoir for a manual applicator of the shown in FIG. 4 including a valve arrangement in accordance with the invention.

The cap element 42 for the reservoir 41, shown in cross-section in FIG. 6, includes a threaded bore 42a for engagement with the threaded mouth of the reservoir 41 and includes an annular flexible seal 61 engageable by the radial face of the threaded mouth of the reservoir 41.

A cylindrical wall 62, surrounds an aperture 42b through the cap element 42 and projects externally of the element 42. The wall 62 is received into the tubular element 43a of the dispensing arrangement 43, whereupon the interior of the reservoir 41 is in open communication with the tubular element 43a of the dispensing arrangement 43.

The said cap element 42 also supports a cylindrical wall 63 which surrounds an aperture 42c through the cap element 42, and which wall 63, is firmly received into the end of the dip-tube 53 remote from the valve body 51. Thus, the bore of the tubular element 63 and the bore of the dip-tube 53 are always open to atmosphere. With the bore of dip-tube 53 at atmosphere pressure the axial bore 59, radial bores 60 and the volume enclosed by the two diaphragms 22 are also at atmosphere pressure.

The length of the dip-tube 53 will normally be selected so that the valve arrangement 52 to 60 inclusive will lie in the upper regions of the reservoir 41 when the reservoir 41 is in its position for use and the said valve will be located within the head space of the reservoir 41 in an early stage in the discharge.

It will now be seen that with the valve arrangement 52 to 60 illustrated in FIG. 5, arranged as illustrated in FIG. 6 for use with the dispensing arrangement illustrated in FIG. 4, the diaphragms 22 are in pressure contact at their respective peripheries 26 for all conditions of the reservoir when the pressure acting on the external surfaces of the diaphragm is greater than a predetermined pressure below atmosphere.

When now, with the discharge of liquid from the reservoir 41, the level of liquid in the reservoir falls and the pressure in the head space reduces to, or below, said predetermined pressure below atmospheric pressure in the volume contained by the diaphragms 22 will cause said diaphragms 22 to deflect, reducing the contact pressure at the peripheral edges 26, until air flows between the peripheral regions 26 of the said diaphragms 22 into the reservoir 41.

With the flow of air between the diaphragms 22 into the head space, the pressure in the head space will increase and, when the pressure in the head space rises above the said predetermined pressure level, the diaphragms 22 will close at their peripheral edges 26 to seal the reservoir 41.

The said predetermined pressure below atmospheric pressure at which the diaphragm 22 or diaphragms 22, will allow air flow into a reservoir is wholly determined by the configuration of the diaphragm(s), the flexibility of the diaphragm(s) 22 and the degree of axial compression applied to the diaphragm(s) 22 and these parameters can be readily adjusted to obtain the desired predetermined pressure difference at which air will flow through the valve arrangement to the head space.

It will be appreciated that, by removing the dip tube 53 and wall 63, the non-return valve arrangement 21, 22 illustrated in FIG. 2 may be applied to the cap 42 for the small volume applicator illustrated in FIG. 4. Further, when the valve body 21 presents a flange 32b as described hereinbefore, the single diaphragm valve arrangement 21, 22 may be substituted for the double diaphragm arrangement illustrated in FIGS. 5 and 6 on the inner end of the dip tube 53.

Figure 7:
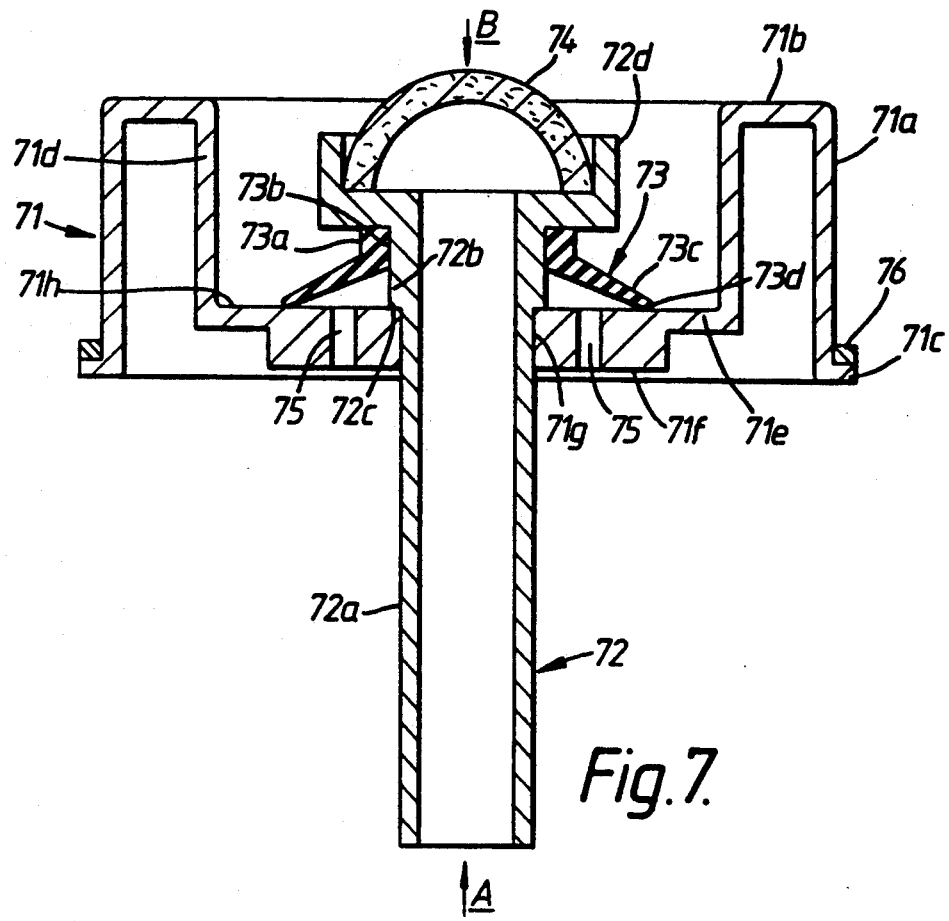
FIG. 7 shows an axial cross-sectional view through a valve arrangement in accordance with the invention.
Figure 8:
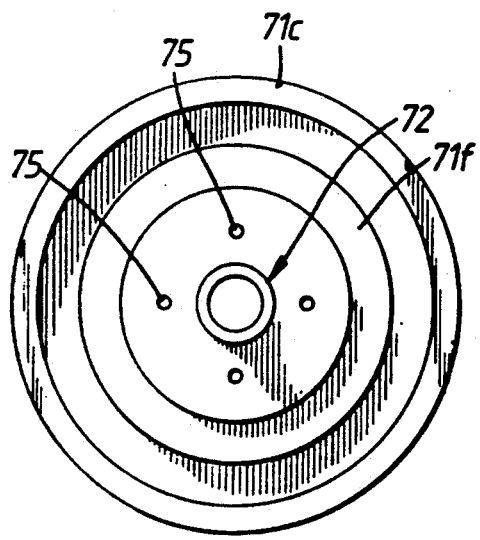
FIG. 8 shows an axial view of the valve arrangement in the direction of the arrow "A", shown in FIG. 7
Figure 9:
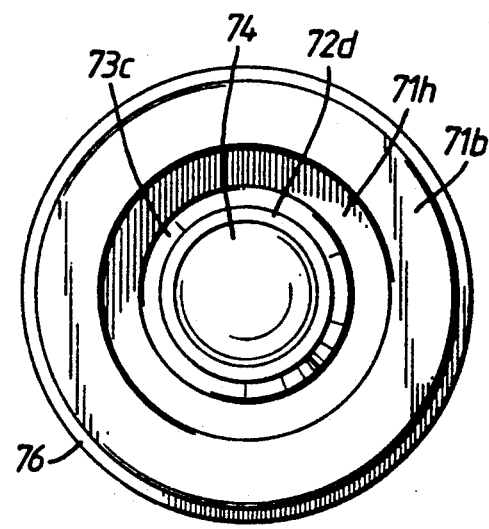
FIG. 9 shows an axial view of the valve arrangement in the direction of the arrow "B" shown in FIG. 7.

In like manner, the valve arrangement illustrated in FIG. 5 may conveniently have a screw thread formed on its connection section 52 to allow the said valve arrangement 22, 51 be applied directly to a reservoir wall W, in identical manner to the valve 21, 22, In the embodiment illustrated in FIG. 7, 8, and 9, intended for use with an applicator as shown in FIG. 4, valve arrangement comprises a support element 71, a tubular element 72, a valve closure member 73, and a filter element 74.

The support element 71 comprises a body of revolution and defines a cylindrical wall 71a an annular inwardly directed radial wall 11b at one end of the wall 71a an outwardly directed flange 71c at the end of wall 71a remote from wall 71b, an inner cylindrical wall 71d extending from the radially innermost part of radial wall 71b and terminating short of the plane of the flange 71c, and a radial wall 71e extends from the end of wall 71d remote from wall 71b to support an annular boss 71f.

The element 71 has an axial bore 71g through the boss 71f and a plurality of ducts 75 in the illustrated example four cylindrical ducts 75, equally spaced about a pitch circle concentric with the bore 71g, pass through boss 71f parallel with the bore 71a.

The tubular element 72 is also a body of revolution and comprises a tubular part 72a having an outer diameter which is a friction fit in the bore 71g in the support element 71, a tubular part 72b which has a diameter greater than the bore 71g, a radial shoulder 72c between the external diameters of the parts 72a and 72b which then limits the entry of the tubular element 72 into the bore 71g, and a cup-like part 72d supported on that end of the tubular part 72b remote from the shoulder 72c. The cup-like part 72d is arranged to frictionally receive and retain the hemispherical filter 74 therein.

The valve closure member 73 is also a body of revolution and is made from a flexible resilient material, conveniently a natural or synthetic rubber, and comprises a central cylindrical part 73a with a bore 73b therethrough and an annular wall 73c extending axially and radially outwardly from one end of the central part 73a. The axially and radially extending wall 73a preferably tapers from its connection with the central part 73a to a minimum thickness at its outermost peripheral regions.

The bore 73b through the valve closure member 73 is slightly smaller than the diameter of the tubular part 72b so that when the tubular part 72b is inserted into the bore of member 73, by flexing the member 73, the bore 73b is in frictional contact with the cylindrical outer surface of the part 72b and, in its operative position, the radial face, of the cylindrical part 73a remote from the axial and radially extending wall 73c abuts the undersurface of the cup element 72d of tubular element 72.

The axial length of the valve closure member 73, when is slightly greater than the axial length of the cylindrical surface of the part 72b, whereupon, when the element 72 is inserted into the bore 71g, entering first through the surface 71h, and the part 72b is driven through the bore 71g until the annular shoulder 72c abuts the surface 71h, the 73d of the axially and radially extending wall 73a abuts the surface 71h, and the member 73 is axially deformed between the undersurface of the cup part 72d and the surface 71a.

The outer periphery 73d of the wall 73a engages the surface 71h at an annulus having a diameter greater than the radially outmost regions of the ducts 75 so that the ducts 75 open into the concave chamber defined within the valve closure member 73.

The parts 71, 72, 73 and 74 are most preferably selected from materials which are inert with respect to the liquid chemicals to be dispensed.

The part 71 may be made from a plastics material and conveniently made by a moulding process. The tubular element 72 may also be made from a plastics materials, and again made by a moulding process.

The valve closure member may be made from any flexible resilient material inert with respect to the chemical material to be dispensed and may conveniently be made by a moulding process.

The filter 74 may be made from plastics or metallic wire material or may comprise a sintered body of a plastics or metal material.

In use the part 71 is inserted into the open outlet of a bottle reservoir for the liquid chemical to be dispensed, the outer cylindrical surface on wall 71a being a friction fit into the smooth bore of the outlet, and the element 71 is inserted into the outlet until the flange 71c, or a resilient sealing ring 16 on the cylindrical wall 71a, abutting flange 71c, abuts the radial face of the reservoir surrounding the outlet. When the reservoir bottle has a screw neck surrounding the outlet the element 71 may be secured to the reservoir by a screw cap (not shown) having a central aperture therethrough of such diameter as to allow the ducts 75 to be open to the surrounding atmosphere.

With the element 71 closing the mouth of the bottle reservoir the duct to the manual controls for the applicator is attached to the tubular element part 72a protruding externally of the element 71 and the assembly can then be inverted, so that the valve arrangement is in the lower regions of the reservoir, ready for use.

With the reservoir in its position for use chemical liquid can flow readily through the filter 74 and through the bore in tubular element 72 to the duct supplying the liquid chemical to the manually actuable dispensing arrangement for the applicator and, in this position, the liquid chemical in the reservoir is continuously in contact with those surfaces of the valve closure 73 exposed within the reservoir.

Whilst the liquid pressure acting on the axially and radially extending wall 73c is greater than atmospheric pressure the closure member 73 maintains the peripheral edge of wall 73c in sealing contact with the surface 71h of element 71, thus preventing chemical leakage through the valve arrangement.

When now, with the applicator dispensing liquid chemicals, the pressure in the headspace falls the liquid pressure acting on the closure 73 also falls until, at a predetermined liquid pressure on the closure 73, and which predetermined pressure is below atmospheric pressure, the peripheral regions 73d of the wall 73a are deformed by the atmospheric pressure beneath the wall 73a and air flows from atmosphere, up the ducts 75 and between the surface 71h and the deflected peripheral edge 73d into the reservoir to form bubbles in the liquid which rise to the headspace.

The predetermined liquid pressure at which the closure member 73 will deflect to allow air flows into the reservoir is determined by the composition of the valve closure member 73 and the axial compression of the closure member 73 between the cup-like part 72d and the surface 71h.

Preferably, the closure member 73 is arranged to deflect to allow air flow into the reservoir before the reduction in liquid pressure in the lower regions of the container reaches that level at which the flow through the applicator becomes interrupted and the dosage dispensed thereby rendered variable.

Whilst in the specific embodiment the valve arrangement has been described with reference, to a bottle reservoir, which may be a conventional 1 liter or 5 liter bottle, the invention is not restricted thereto and, for example, the valve arrangement could be inserted into an aperture in the lower regions of a back-pack or knapsack reservoir.

I claim:

1. A manual applicator, for dispensing liquid chemicals, comprising a reservoir for liquid chemicals to be dispensed, said reservoir when partially filled with liquid chemical defining a head space above the liquid chemical in the reservoir, an opening being formed in a wall of said reservoir in said head space, an outlet duct leading from said reservoir and through which duct liquid chemical is discharged from said reservoir, a dispensing apparatus connected to said outlet duct and a non-return valve arrangement including a diaphragm valve within said reservoir, said valve arrangement being located on said reservoir for communication with said opening, said diaphragm valve being arranged to open to allow air to flow into said reservoir only while the pressure in the head space above the liquid chemical in the reservoir is less than a predetermined pressure below atmosphere and wherein said diaphragm is of annular form and defines a central region having radial faces, a central bore passing axially through said central region and a surrounding region surrounding said central region and terminating at a peripheral edge region concentric with the axis of said central bore and wherein, in an unstressed condition of the diaphragm, said peripheral edge region of said diaphragm lies in a plane parallel to, but spaced from, the planes of the radial faces of the central region of said diaphragm.

2. A manual applicator according to claim 1, and wherein a thickness of said diaphragm reduces from said central region thereof towards said peripheral edge region.

3. A manual applicator according to claim 1, wherein said central bore passing through the diaphragm comprises a tapered bore having larger and smaller diameter end regions, the smaller diameter end region of said tapered bore being at the end region of said bore remotest from the plane of said peripheral edge region of the diaphragm.

4. A manual applicator, for dispensing liquid chemicals, comprising a reservoir for liquid chemicals to be dispensed, said reservoir when partially filled with liquid chemical defining a head spaced above the liquid chemical in the reservoir, an opening being formed in a wall of said reservoir in said head space, an outlet duct leading from said reservoir through which duct liquid chemical is discharged from said reservoir, a dispensing apparatus connected to said outlet duct and a non-return valve arrangement opening into said reservoir, said valve arrangement being located on said reservoir for communication with said opening, said non-return valve being openable to allow air to flow into said reservoir only while the pressure in the head space above the liquid chemical is less than a predetermined pressure below atmosphere and wherein the non-return valve includes a valve body and a diaphragm mounted on the valve body, said valve body being of generally cylindrical form and defining a blind bore extending axially into one end thereof and being continuously open to atmosphere, and a radial bore in open communication with said blind bore, said diaphragm being within said reservoir and defining a central region and a surrounding area surrounding said central area and terminating at a peripheral edge region, said peripheral edge region of said diaphragm lying in a plane parallel to, but spaced from, the planes of the radial faces of said central region of said diaphragm, said central region defining a central bore passing axially therethrough, and wherein said valve body enters into the said central bore of the said diaphragm to support said diaphragm within the reservoir.

5. A manual applicator according to claim 4, wherein said central bore passing through the central part of the diaphragm comprises a tapered bore and said valve body defines a tapered seat for said tapered bore of said diaphragm.

6. A manual applicator according to claim 4, wherein the said diaphragm is mounted on said valve body such that the plane of the said peripheral edge region of said diaphragm is at right angles to the axis of the said valve body.

7. A manual applicator according to claim 4, wherein the said valve body supports a single diaphragm such that when the diaphragm is mounted on the valve body, the plane of the axis of said radial bore defined by said valve body lies between said plane of the peripheral edge region of the diaphragm and the plane of the radial face of the central region of the diaphragm in closest proximity to said plane of the peripheral edge region.

8. A manual applicator according to claim 4, wherein said peripheral edge region of the diaphragm directly contacts a plane surface defining part of the internal surface within the reservoir when said diaphragm is in a closing condition.

9. A manual applicator according to claim 4, wherein the valve body includes a flange and said flange defines a plane surface engageable by said peripheral edge region of the diaphragm to define a closing condition for the valve arrangement.

10. A manual applicator, for dispensing liquid chemicals, comprising a reservoir for liquid chemicals to be dispensed, said reservoir when partially filled with liquid chemical defining a head space above the liquid chemical in the reservoir, an opening being formed in a wall of said reservoir in said head space, an outlet duct leading from said reservoir and through which duct liquid chemical is discharged from said reservoir, a dispensing apparatus connected to said outlet duct and a non-return valve arrangement opening into said reservoir, said non-return valve being arranged to open to allow air to flow into said reservoir only while the pressure in the head space above the liquid chemical is less than a predetermined pressure below atmosphere, said valve arrangement being located on said reservoir for communication with said opening, the non-return valve including a valve body and two identical diaphragms mounted on the valve body in oppositely facing relationship, said valve body being of generally cylindrical form and defining a blind bore extending axially into one end thereof and being continuously open to atmosphere, and a radial bore in open communication with said axial bore and wherein said two diaphragms are both within said reservoir, each diaphragm defining a central region and surrounding region surrounding said central region and terminating at a peripheral edge region, said peripheral edge region of said diaphragm lies in a plane parallel to, but spaced from, the planes of the radial faces of said central region of said diaphragm, and central region defining a central bore therethrough, said valve body entering into the said central bores of the said two diaphragms to support said diaphragms within the reservoir, the two diaphragms being supported on the valve body such that their peripheral edge regions are in contacting relationship and the plane passing through the axis of the radial bore lies between the central regions of the two diaphragms.

11. A manual applicator according to claim 10, wherein said central bore passing the central part of each said diaphragm comprises a tapered bore, the smallest diameter of said tapered bore being at the part of the central region remotest from the plane of the peripheral edge region of the diaphragm, and said valve body defining two oppositely tapering seats for receiving said tapered bores of said two diaphragms.

12. A manual applicator according to claim 10, wherein the plane passing through the axis of said radial bore at right-angles to said axis of said valve body lies in the plane of contact of the peripheral edge regions of the two diaphragms.

13. A manual applicator according to claim 10, wherein the valve body is directly connected to a wall defining the reservoir and that end region of the said valve body including the opening communicating with said axial bore passes through the reservoir wall to continually expose said blind bore to atmosphere.

14. A manual applicator according to claim 10, wherein said reservoir includes a closure member and the valve body is directly connected to said closure member.

15. A manual applicator according to claim 10, wherein said non-return valve is mounted on one end of a dip-tube located within the reservoir, and said dip-tube is open to atmosphere through an apertured wall region of the reservoir.

16. A manual applicator, for dispensing liquid agricultural chemicals, comprising a reservoir for liquid chemical to be dispensed, an outlet duct leading from said reservoir and a dispensing apparatus being connected to said outlet duct, and a non-return valve arrangement connected to said reservoir, said non-return valve arrangement being located on said outlet duct and communicating with an opening formed in said reservoir, comprising a tubular body having a bore which defines the liquid chemical outlet from the reservoir, and a diaphragm mounted on said tubular body, and wherein said diaphragm comprising a central region defined between two, parallel radial faces, a surrounding region surrounding said central region and terminating at a peripheral edge region, said peripheral edge region of said diaphragm lying in a plane parallel to, but spaced from, the planes of said radial faces defining said central region and said central region defining a central bore therethrough for receiving said tubular body therein, the peripheral edge region being arranged to contact an internal surface of the reservoir when the valve is in a closing condition, and air ducts passing through the wall of the reservoir within the area bounded by the area of contact of said peripheral edge with said internal surface of the reservoir.

17. A manual applicator according to claim 16, wherein said tubular body has one end open to the interior of the reservoir and an opposite end projecting from the reservoir to enable said outlet duct to be attached thereto.

18. A manual applicator according to claim 16, wherein said reservoir includes said opening in the lower region of said reservoir when the reservoir is in a normal position for dispensing liquid chemical, said opening being closed by a closure member, a surface region of said closure member constituting a part of the reservoir wall, and said tubular body being passed through said closure member and being supported thereby.

* * * * *